(12) United States Patent
Yamakawa

(10) Patent No.: US 8,292,053 B2
(45) Date of Patent: Oct. 23, 2012

(54) ONE-WAY CLUTCH AND POWER TRANSMISSION APPARATUS

(75) Inventor: Tadasu Yamakawa, Kashiwara (JP)

(73) Assignee: JTekt Corporation, Osaka-Shi, Osaka (JP)

( * ) Notice: Subject to any disclaimer, the term of this patent is extended or adjusted under 35 U.S.C. 154(b) by 616 days.

(21) Appl. No.: 11/896,570

(22) Filed: Sep. 4, 2007

(65) Prior Publication Data
US 2008/0067025 A1 Mar. 20, 2008

(30) Foreign Application Priority Data

Sep. 5, 2006 (JP) ................ P2006-239853

(51) Int. Cl.
*F16D 41/067* (2006.01)
(52) U.S. Cl. ................ 192/45.006; 192/107 T
(58) Field of Classification Search ........ 192/45, 192/45.1, 38, 107 T; 188/82.1, 82.84
See application file for complete search history.

(56) References Cited

U.S. PATENT DOCUMENTS

| 3,731,774 | A | 5/1973 | Kitchin | |
|---|---|---|---|---|
| 5,014,833 | A | 5/1991 | Johnston | |
| 6,588,560 | B1 * | 7/2003 | Fujiwara | 192/45 |
| 2001/0000285 | A1 * | 4/2001 | Tanaka | 192/45 |
| 2001/0013453 | A1 * | 8/2001 | Hori | 192/45 |
| 2005/0087417 | A1 * | 4/2005 | Shimomura et al. | 192/45 |
| 2005/0284720 | A1 | 12/2005 | Ogata et al. | |

FOREIGN PATENT DOCUMENTS

| GB | 2265192 A | * | 9/1993 |
|---|---|---|---|
| JP | 2000-234638 | | 8/2000 |
| JP | 2002-130433 | | 5/2002 |
| JP | 2005-207486 | | 8/2005 |
| JP | 2005-326000 | | 11/2005 |
| JP | 2006-029492 A | | 2/2006 |

OTHER PUBLICATIONS

European Search Report dated Nov. 18, 2008.
Japanese Office Action dated May 10, 2011 with English translation thereof.

* cited by examiner

*Primary Examiner* — David D Le
*Assistant Examiner* — Ryan Dodd
(74) *Attorney, Agent, or Firm* — McGinn IP Law Group, PLLC

(57) ABSTRACT

A one-way clutch includes an inner ring, an outer ring disposed coaxially with the inner ring, a plurality of rollers interposed between the inner and outer rings, a cage holding the rollers to locate these rollers in a circumferential direction of the inner and outer rings. When the rollers are brought into biting engagement with an outer peripheral surface of the inner ring and an inner peripheral surface of the outer ring, the inner and outer rings rotate in unison, and when the rollers are disposed out of biting engagement with the inner and outer rings, the inner and outer rings rotate relative to each other. Grooves are formed in the outer peripheral surface of the inner ring, and each of the grooves serves to increase a contact pressure of the corresponding roller relative to the inner ring at part of a region of contact between the roller and the inner ring.

13 Claims, 5 Drawing Sheets

FIG. 4
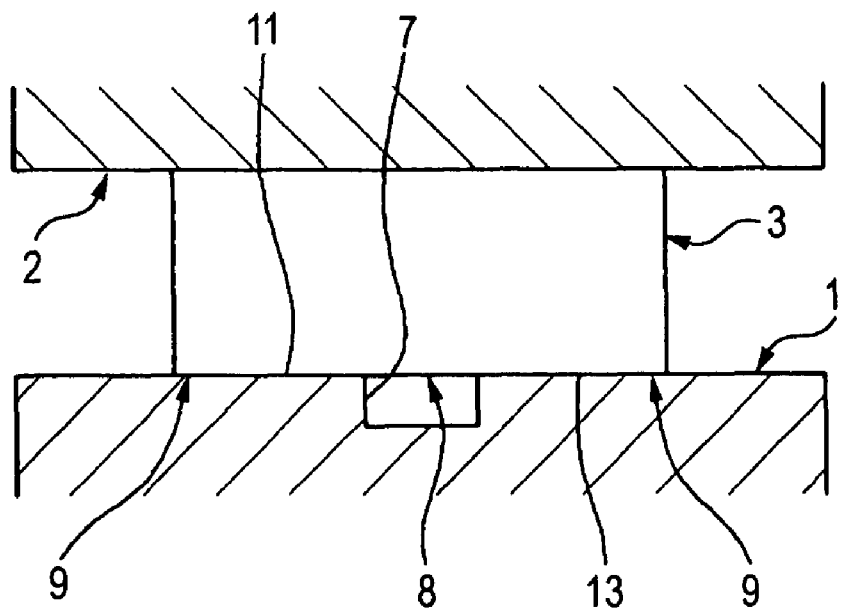
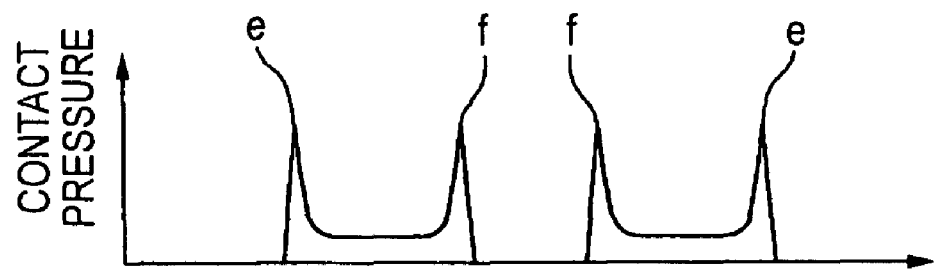

FIG. 5
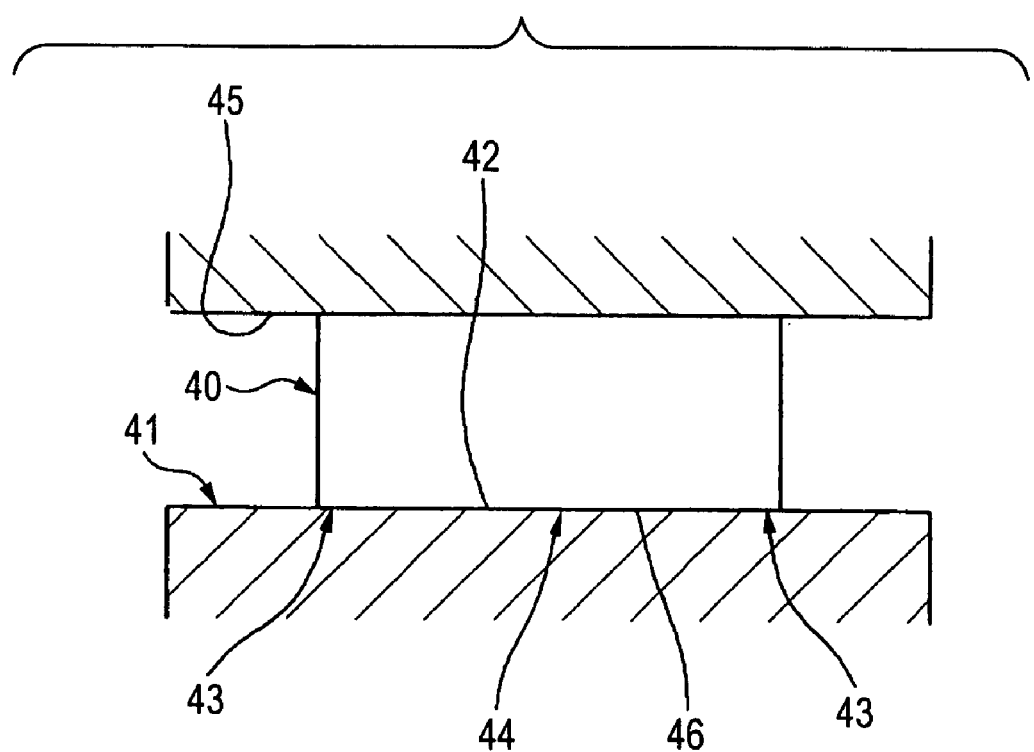
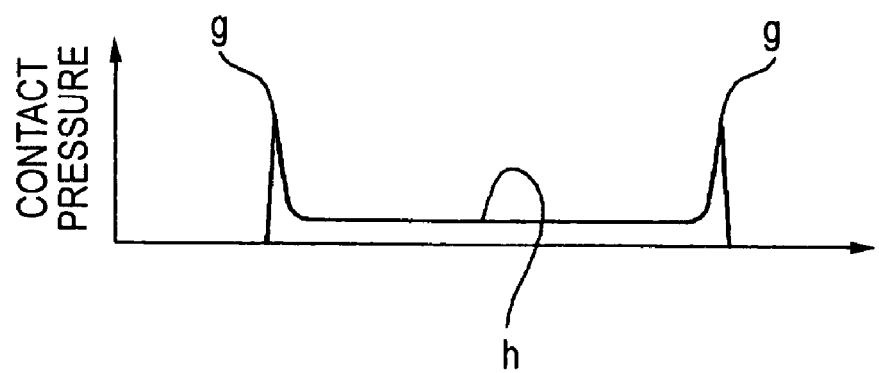

ONE-WAY CLUTCH AND POWER TRANSMISSION APPARATUS

BACKGROUND OF THE INVENTION

1. Field of the Invention

This invention relates to a one-way clutch and a power transmission apparatus provided with this one-way clutch.

2. Related Art

An auxiliary equipment such as an alternator driven by rotation of a crankshaft of an engine is mounted on a vehicle such as an automobile. An endless belt is extended around a pulley fixed to a rotation shaft of the alternator and a pulley fixed to the crankshaft of the engine. The alternator uses rotating power of the engine as its drive source. In the case where the rotating power of the engine is thus used as the drive source of the alternator, the rotational speed of the crankshaft of the engine periodically varies, and therefore there are encountered a problem that slip occurs between the endless belt and the pulley of the alternator, so that abnormal noises are generated, and also the belt is worn.

Therefore, in such an alternator, it has been proposed to provide a one-way clutch between the rotation shaft and the pulley of the alternator in order to suppress the above problem. This one-way clutch as disclosed in JP-A-2002-130433 Publication comprises an inner ring fixed to the rotation shaft of the alternator, an outer ring fixed to the pulley, a plurality of rollers provided respectively in wedge-like spaces formed between the inner and outer rings, a cage holding these rollers, and springs urging the respective rollers in one direction. When the rotational speed of the outer ring becomes higher than that of the inner ring, so that the outer ring tends to rotate relative to the inner ring, the rollers bite into the respective wedge-like spaces, thereby establishing a locked state disenabling the relative rotation between the inner ring and the outer ring. On the other hand, when the rotational speed of the outer ring becomes lower than that of the inner ring, the biting engagement of the rollers is canceled, thereby establishing a free state allowing the relative rotation between the inner ring and the outer ring. Thus, the one-way clutch is switched between the locked state and the free state, and by doing so, the above-mentioned variation in the rotational speed can be absorbed, and the above problem is suppressed.

In the above one-way clutch used in the alternator or the like, in order to enhance the performance of biting engagement of the rollers with the inner and outer rings particularly in a low-temperature environment, it may be proposed to adopt means for using grease with excellent low-temperature characteristics as disclosed in the above JP-A-2002-130433 Publication, means decreasing the wedge angle between the contact surfaces of the roller and the outer ring, and means increasing the spring constant of the springs.

However, when the grease with the excellent low-temperature characteristics is used, the one-way clutch achieves an excellent performance in a low-temperature condition as when starting the engine, but subsequently in a high-temperature condition, the performance of the grease is lowered, and the generation of heat, etc., occur, and this leads to a fear that the lifetime of the one-way clutch may be shortened. In the case where the wedge angle between the contact surfaces of the roller and the outer ring is decreased, the contact pressure between these contact surfaces increases, so that heat is generated, and this lead to fears that the lifetime of the one-way clutch may be shortened and that the rollers may be bitingly held between the inner and outer rings to invite the locked state in a situation in which the inner and outer rings need to rotate relative to each other. Furthermore, in the case where the spring constant of the springs is increased, frictional heat between each roller and the inner and outer rings increases, and also the amount of the lubricant becomes insufficient, which leads to a fear that the lifetime of the one-way clutch may be shortened. Thus, although the conventional means can enhance the performance of biting engagement of the rollers with the inner and outer rings, these means lower other performances of the one-way clutch.

Furthermore, in recent years, engines have been enhanced in performance so as to produce a high output power, and as a result a variation in the rotational speed of a crankshaft of the engine has become larger. Therefore, the one-way clutch provided at an alternator or the like need to be smoothly and rapidly switched between the free state and the locked state. However, in the conventional one-way clutch, even when the above means are used, a film of grease exists between the contact surfaces of the roller and each of the inner and outer rings, and slip occurs between these contact surfaces, so that the required friction coefficient can not be obtained, and in some cases the above variation in the rotational speed can not be suitably absorbed. Particularly in a low-temperature environment, the viscosity of the grease increases, and a film of the grease formed between the contact surfaces, and slip is liable to occur, so that a tendency for failure to suitably absorb the variation in the rotational speed becomes strong.

SUMMARY OF THE INVENTION

Therefore, it is an object of this invention to provide a novel one-way clutch in which the performance of biting engagement of engagement elements with inner and outer rings can be enhanced, and also to provide a power transmission apparatus provided with this one-way clutch.

The above object has been achieved by a one-way clutch comprising an inner ring, an outer ring disposed coaxially with the inner ring, a plurality of engagement elements interposed between the inner and outer rings, a cage holding the engagement elements to locate the engagement elements in a circumferential direction of the inner and outer rings, wherein when the engagement elements contact the inner and outer rings, and are brought into biting engagement with the inner and outer rings, the inner and outer rings rotate in unison, and when the engagement elements are disposed out of biting engagement with the inner and outer rings, the inner and outer rings rotate relative to each other; characterized in that a contact pressure-increasing portion is formed at at least one of an outer peripheral surface of the inner ring, an inner peripheral surface of the outer ring and an outer peripheral surface of the engagement element, and the contact pressure-increasing portion serves to increase a contact pressure of the engagement element relative to the inner or the outer ring at part of a region of contact between the engagement element and the inner or the outer ring.

In this one-way clutch, the pressure of contact of the engagement element with (that is, the contact pressure of the engagement element relative to) the inner or the outer ring is increased at part of the region of contact (hereinafter often referred to as "contact region") therebetween by the contact pressure-increasing portion, and a film of grease can be squeezed or crushed by this increased contact pressure. Therefore, slip due to a grease film interposed between the engagement element and the inner or the outer ring is suppressed, and the lowering of a coefficient of friction between the engagement element and the inner or the outer ring can be suppressed, so that the performance of the biting engagement can be enhanced.

Preferably, the contact pressure-increasing portion is defined by a groove extending in a direction of rotation of the inner and outer rings.

With this construction, the contact pressure of the engagement element relative to the inner or the outer ring can be increased by edge loads at the region where the groove is formed. With this simple construction in which the groove is formed, the contact pressure can be increased at part of the contact region.

In the above one-way clutch, preferably, a width dimension of the groove is smaller than a width dimension of contact surfaces of the engagement element and the inner or the outer ring contacted with each other.

With this construction, the reduction of the contact surfaces of the engagement element and the inner or outer ring is suppressed, and the reduction of the loading capacity of the one-way clutch can be prevented.

According to another aspect of the invention, there is provided a power transmission apparatus comprising an annular inner member, an annular outer member disposed coaxially with the inner member, a one-way clutch as defined in any one of claims 1 to 3 which is disposed between the inner and outer members, and a pair of rolling bearings disposed near respectively to axially-opposite end portions of the one-way clutch; wherein the outer ring of the one-way clutch rotates together with the outer member, and the inner ring of the one-way clutch rotates together with the inner member.

This power transmission apparatus is provided with the above one-way clutch, and therefore slip due to a grease film interposed between the engagement element and the inner or the outer ring is suppressed, and the lowering of the coefficient of friction between the engagement element and the inner or the outer ring can be suppressed, so that the performance of the biting engagement can be enhanced. Therefore, the one-way clutch can be smoothly shifted from a free state in which the inner and outer rings rotate relative to each other to a locked state in which the inner and outer rings rotate in unison, and a variation in the rotational speed developing between the outer member and the inner member can be absorbed.

In the present invention, slip due to a grease film interposed between the engagement element and the inner or the outer ring is suppressed, and the lowering of the coefficient of friction between the engagement element and the inner or the outer ring can be suppressed, so that the performance of the biting engagement can be enhanced.

BRIEF DESCRIPTION OF THE DRAWINGS

FIG. 4 is a view explanatory of a contact pressure developing between the roller and the inner ring of the one-way clutch.

FIG. 5 is a view explanatory of a contact pressure developing between a roller and an inner ring of a conventional one-way clutch.

DETAILED DESCRIPTION OF THE PREFERRED EMBODIMENTS

A preferred embodiment of the present invention will now be described with reference to the drawings.

Figure 1:
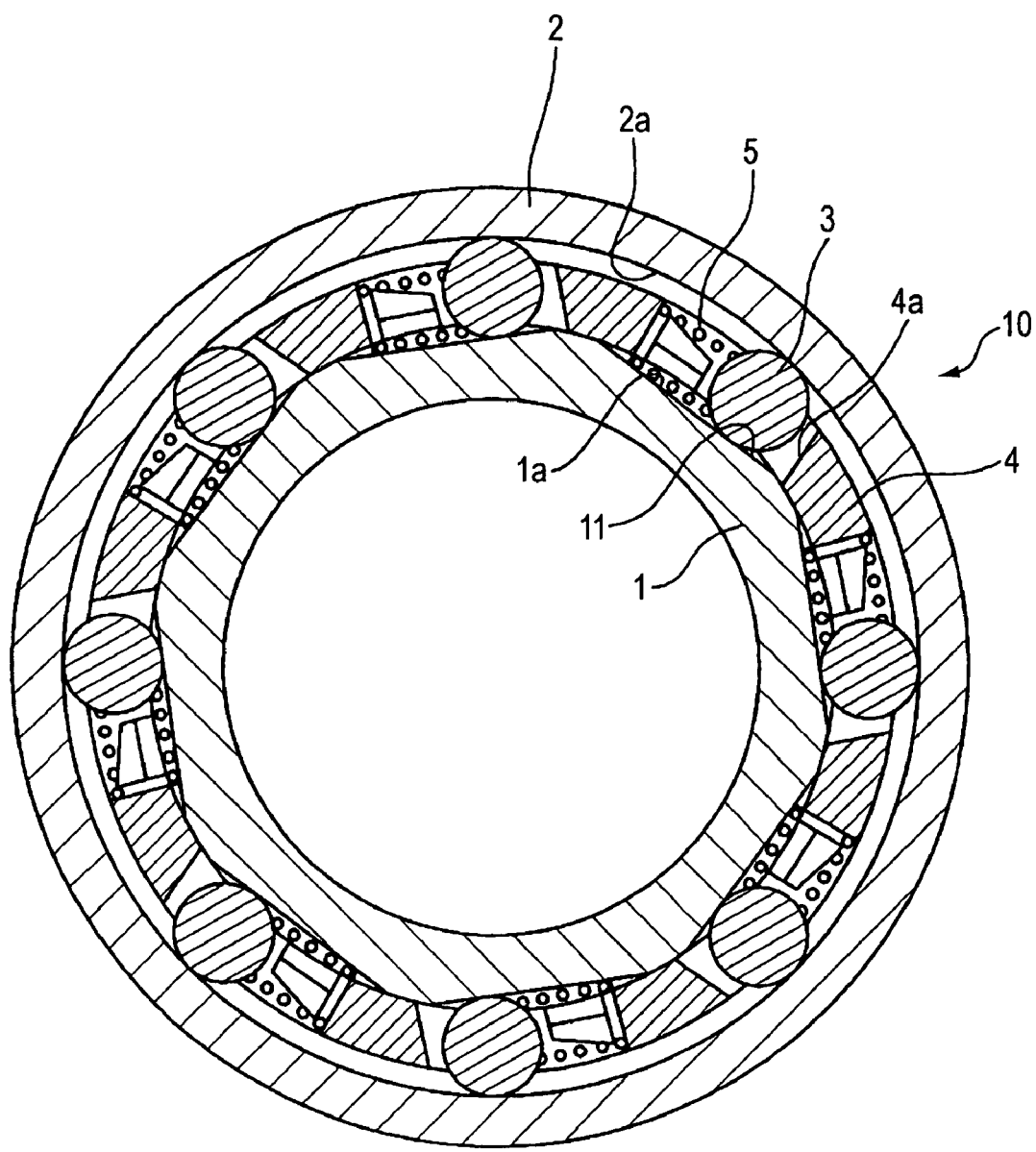
FIG. 1 is a cross-sectional view of a one-way clutch of the present invention.
Figure 2:
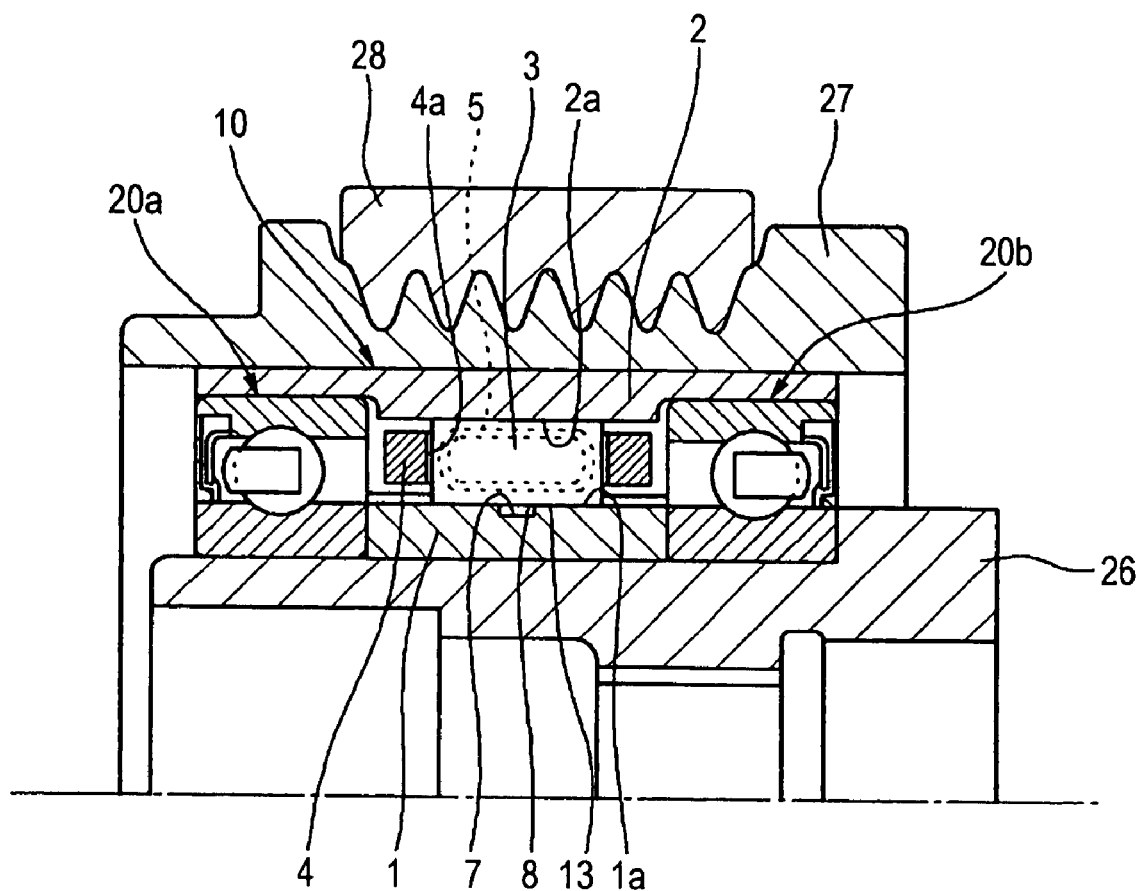
FIG. 2 is a cross-sectional view of a power transmission apparatus provided with the one-way clutch.

FIG. 1 is a cross-sectional view of a one-way clutch of the invention, and FIG. 2 is cross-sectional view of a power transmission apparatus provided with this one-way clutch. The power transmission apparatus of FIG. 2 is a one-way clutch built-in type pulley apparatus (hereinafter also referred to as "pulley apparatus") for an alternator to be mounted on a vehicle such as an automobile. This pulley apparatus comprises an annular sleeve (inner member) 26 fixed to a rotation shaft (not shown) of the alternator, and an annular pulley (outer member) 27 disposed around the sleeve 26 in coaxial relation thereto. A belt groove is formed in an outer peripheral surface of the pulley 27, and an endless drive belt 28 is extended around this belt groove portion of the pulley 27. The drive belt 28 is extended around the pulley 27 and a drive pulley (not shown) fixed to a crankshaft of an engine.

The one-way clutch 10, as well as a pair of rolling bearings 20a and 20b, is provided between the sleeve 26 and the pulley 27. The pair of rolling bearings 20a and 20b are arranged such that the one-way clutch 10 is generally held between the two rolling bearings 20a and 20b in an axial direction of the one-way clutch 10. The rolling bearings 20a and 20b are disposed near respectively to axially-opposite end portions of the one-way clutch 20. For example, each of the rolling bearings 20a and 20b can take the form of a deep groove ball bearing, and the two rolling bearings 20a and 20b support the sleeve 26 and the pulley 27 in a manner to allow relative rotation between the sleeve 26 and the pulley 27, and also bear radial loads acting on the pulley 27.

In FIGS. 1 and 2, the one-way clutch 10 comprises an inner ring 1 fitted on and fixed to the sleeve 26 so as to rotate therewith, an outer ring 2 fixed to an inner peripheral surface of the pulley 27 in coaxial relation to the inner ring 1 so as to rotate together with the pulley 27, and a plurality of rollers (engagement elements) 3 disposed between an outer peripheral surface 1a of the inner ring 1 and an inner peripheral surface 2a of the outer ring 2. The one-way clutch 10 further comprises a cage 4 having pockets 4a receiving the respective rollers 3 and holding the rollers 3 to locate them in a circumferential direction of the inner and outer rings 1 and 2, and resilient members (coil springs) 5 fixed to the cage 4 and resiliently urging the respective rollers 3 in one direction. In FIG. 1, the annular cage 4 holds the eight rollers 3 at equal intervals in the circumferential direction.

The inner peripheral surface 2a of the outer ring 2 is a cylindrical surface, and the outer peripheral surface 1a of the inner ring 1 has eight cam surfaces 11 corresponding in number to the rollers 3. A wedge-like space is formed between the cylindrical surface 2a of the outer ring 2 and each cam surface 11 of the inner ring 1. The rollers 3 are provided respectively in the wedge-like spaces, and the cage 4 holds the rollers 3 at equal intervals in the circumferential direction, and each of the resilient members 5 urges the corresponding roller 3 to a narrower portion of the corresponding wedge-like space. Each of the rollers 3 has a cylindrical shape, and axes of the rollers 3 are disposed parallel to the axis of the one-way clutch 10. The outer peripheral surface of the roller 3 serves as a contact surface contacting the inner peripheral surface 2a of the outer ring 2 and the cam surface 11 of the inner ring 1, and this contact surface is straight in a direction of the width (the axis).

In the pulley apparatus provided with the one-way clutch 10 of the above construction, when the rotational speed of the pulley 27 is higher than the rotational speed of the sleeve 26 fixed to the rotation shaft of the alternator or rotation acceleration of the pulley 27 is larger than rotation acceleration of the sleeve 26, that is to say, when the outer ring 2 of the one-way clutch 10 is about to rotate relative to the inner ring 1, the rollers 3 are slightly moved to the narrower portions of the respective wedge-like spaces by the urging forces of the respective resilient members 5, and contact surfaces 13 of the rollers 3 contact the outer peripheral surface 1a of the inner ring 1 and the inner peripheral surface 2a of the outer ring 2, and the rollers 3 are bitingly held between the inner and outer rings 1 and 2. When the rollers 3 are thus bitingly held between the inner and outer rings 1 and 2, the inner and outer rings 1 and 2 rotate in unison, thereby establishing a locked state disenabling the relative rotation between the pulley 27 and the sleeve 26. In this condition, rotating power is transmitted from the engine to the rotation shaft (not shown) of the alternator via the drive belt 28, the pulley 27, the one-way clutch 10 and the sleeve 26.

On the other hand, when the rotational speed of the pulley 27 is lower than the rotational speed of the sleeve 26 fixed to the rotation shaft of the alternator or rotation acceleration of the pulley 27 is smaller than rotation acceleration of the sleeve 26, the rollers 3 are slightly moved to wider portions of the respective wedge-like spaces against the urging forces of the respective resilient members 5, and the biting engagement of the rollers 3 with the inner and outer rings 1 and 2 is canceled, so that the inner and outer rings 1 and 2 can rotate relative to each other, thus establishing a free state allowing the relative rotation between the pulley 27 and the sleeve 26. As a result, the sleeve 26 can maintain the required number of revolutions without following a variation (decrease) of the number of revolutions of the pulley 27. Thus, even when a variation develops in the rotational speed of the engine side, power of the engine side can be transmitted to the rotation shaft of the alternator while absorbing this variation by switching the one-way clutch 10 between the locked state and the free state. This one-way clutch 10 is disposed in an environment in which grease serving as lubricant is provided between the inner ad outer rings 1 and 2.

Figure 3:
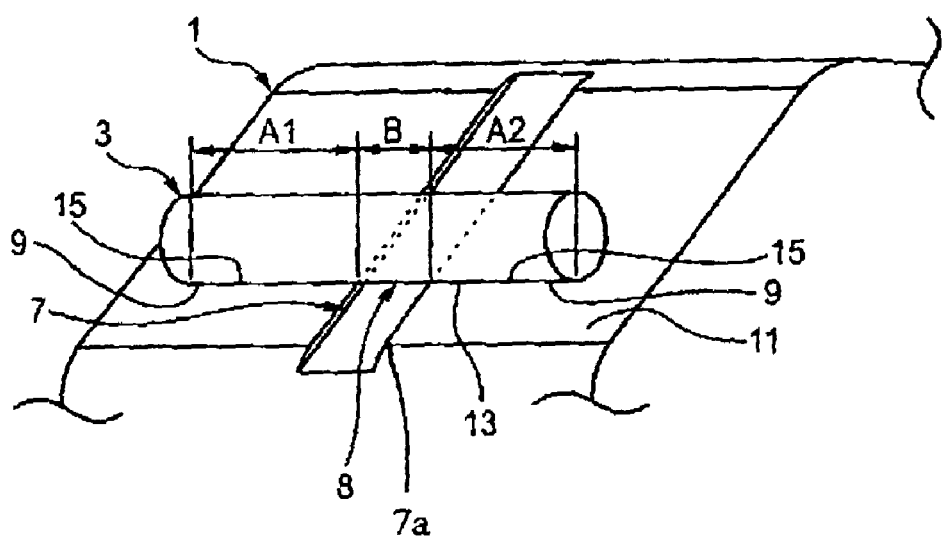
FIG. 3 is a perspective view showing a roller and a portion of an inner ring.

FIG. 3 is a perspective view showing the roller 3 and a portion of the inner ring 1. In the one-way clutch 10 of the invention, a groove 7 is formed in each cam surface 11 of the inner ring 1, and extends in the direction of rotation of the inner and outer rings 1 and 2. This groove 7 serves as a contact pressure-increasing portion for increasing the pressure of contact of the roller 3 with (that is, the contact pressure of the roller 3 relative to) the inner ring 1 at part of the region of contact therebetween (that is, at part of the region of contact between the roller 3 and the inner ring 1) when the roller 3 is bitingly held between the inner and outer rings 1 and 2. The groove 7 increases the contact pressure at part of the region of contact between the inner ring 1 and a widthwise-intermediate portion 8 of the roller 3. This intermediate portion 8 is a central portion of the contact surface 13 except widthwise-opposite end portions 9 and 9. More specifically, a length of each of the opposite end portions 9 and 9 is 10 percent of the overall length of the roller 3, and the length of the intermediate portion 8 is the remainder, that is, 80 percent.

The groove 7 shown in FIG. 3 is a single straight groove formed in a widthwise-central portion of the cam surface 11. At opposite sides of the groove 7 in the widthwise direction, the inner ring 1 and the roller 3 are contacted with each other at their smooth flat surfaces. The direction of the length of the groove 7, that is, the direction of extending of the groove 7, is parallel to the direction of movement of the roller 3 effected when the one-way clutch 10 is switched between the locked state and the free state. Furthermore, a width dimension B of the groove 7 (that is, the dimension between opposite side edges of an opening of the groove 7) is smaller than combined width dimensions A (=A1+A2) of those portions (contact surfaces) of the roller 3 contacted with the inner ring 1.

Preferably, the width dimension B of the groove 7 is not larger than 30% of the combined width dimensions A. When the width dimension B is too large, the pressure receiving area is reduced, and a loading capacity of the one-way clutch 10 is reduced, and also there is a fear that the biting engagement performance is lowered. In the case where a plurality of grooves 7 are formed as described later, the total of width dimensions (each between opposite edges of a groove opening) of these grooves 7 is smaller than the combined width dimensions A of the contact surfaces, and the total of the width dimensions of the grooves 7 is not larger than 30% of the combined width dimensions A of the contact surfaces. The depth of the groove 7 can be set to the range of from 0.3 mm to 0.7 mm. Furthermore, the groove 7 may extend continuously between opposite end edges of the cam surface 11 as shown in FIG. 3, or may be formed only at that portion of the cam surface 11 for biting engagement with the roller 3 although this example is not shown in the drawings.

FIG. 4 is a view explanatory of a contact pressure developing between the roller 3 and the inner ring 1 of the one-way clutch 10 of FIG. 3, and FIG. 5 is a view explanatory of a contact pressure developing between a roller 40 and an inner ring 41 of a conventional one-way clutch.

In FIG. 4, when the cam surface 11 of the inner ring 1 and the contact surface 13 of the roller 3 contact each other in the condition in which the roller 3 is bitingly held between the inner and outer rings 1 and 2, portions e and e where the contact pressure is increased by respective edge loads are produced respectively at a region of contact between one end portion 9 of the roller 3 and the inner ring 1 and at a region of contact between the other end portion 9 and the inner ring 1 in a distribution of the pressure of contact between the cam surface 11 and the contact surface 13. And besides, since the groove 7 is formed in the cam surface 13 of the inner ring 1, portions f and f where the contact pressure is increased by respective edge loads are produced at a region of contact between the intermediate portion 8 of the roller 3 and the inner ring 1.

On the other hand, in FIG. 5, when a cam surface 42 of the inner ring 41 and a contact surface 46 of the roller 40 contact each other in a condition in which the roller 40 is bitingly held between inner and outer rings 41 and 45, portions g and g where the contact pressure is increased by respective edge loads are produced respectively at a region of contact between one end portion 43 of the roller 40 and the inner ring 41 and at a region of contact between the other end portion 43 and the inner ring 41 in a distribution of the pressure of contact between the cam surface 42 and the contact surface 46. A contact pressure h of a uniform distribution develops at an intermediate portion 44.

As described above, in the present invention, the contact pressure-increased portions (the contact pressure concentration) can be produced respectively at the region of contact between the one end portion 9 of the roller 3 and the inner ring 1 and at the region of contact between the other end portion 9 and the inner ring 1, and further because of the formation of the groove 7 in the cam surface 11, the contact pressure-increased portions (the contact pressure concentration) can be produced at the region of contact between the widthwise-intermediate portion 8 of the roller 3 and the cam surface 11 of the inner ring 1. Therefore, a film of the grease can be squeezed or crushed between the contact surface 13 of the roller 3 and the cam surface 11 of the inner ring 1 by the contact pressure concentration developing between the inner ring 1 and the widthwise-intermediate portion 8 of the roller 3. Therefore, when the roller 3 is bitingly held between the inner and outer rings 1 and 2 so as to achieve the locked state, slip of the contact surfaces of the roller 3 and cam surface 11 relative to each other which slip is caused by this grease film interposed between these contact surfaces can be suppressed. Therefore, the lowering of the coefficient of friction between the contact surfaces of the roller 3 and cam surface 11 can be suppressed.

Therefore, the one-way clutch 10 can be smoothly shifted between the free state in which the inner and outer rings 1 and 2 rotate relative to each other to the locked state in which the inner and outer rings 1 and 2 rotate in unison. Therefore, in the pulley apparatus shown in FIG. 2, a variation of the rotational speed developing between the pulley 27 and the sleeve 26 can be more satisfactorily absorbed as compared with the conventional apparatus. Thus, by providing the grooves 7, the performance of biting engagement of the rollers 3 with the inner ring 1 can be enhanced.

Furthermore, by providing the groove 7 in each cam surface 11, the contact pressure heretofore developing with a large value at part of the region of contact between the roller 3 and the inner ring 1 can be distributed to the four regions, that is, the two regions of the opposite end portions 9 and 9 and the two regions of the intermediate portion 8. Namely, the number of the portions or regions where the higher contact pressures develop are increased by two as compared with the conventional apparatus.

Furthermore, the contact pressure-increasing portion is defined by the groove 7, and with this simple construction the contact pressure concentration can be caused to develop between the inner ring 1 and the widthwise-intermediate portion 8 of the roller 3. Furthermore, the grooves 7 can be formed in a process of forming the cam surfaces 11 on the outer peripheral surface 1a of the inner ring 1, and the one-way clutch 10 can be easily produced. Preferably, the opposite side edges of the opening of the groove 7 are formed respectively into chamfered portions 7a (fine chamfered portions). With this construction, the contact pressure concentration is caused to develop between the widthwise-intermediate portion 8 of the roller 3 and the inner ring 1, thereby squeezing the grease film.

As described above, in the invention, by providing the grooves 7, the performance of biting engagement of the rollers 3 can be enhanced. Therefore, it is not necessary to decrease the wedge angle between the roller and the outer ring, to increase the spring constant of the resilient members 5 and to decrease the viscosity of the grease, which means have been required in the conventional example in order to enhance the biting engagement performance. Therefore, the lowering of other performances (such as a shortened lifetime of the one-way clutch due to an increased frictional heat caused by the use of these means as in the conventional example) can be prevented.

In the pulley apparatus of FIG. 2, the one-way clutch 10 can be smoothly shifted from the free state to the locked state, and even when a variation of the rotational speed developing between the pulley 27 and the sleeve 26 is larger than in the conventional apparatus, this variation can be suitably absorbed by the one-way clutch 10. More specifically, conventionally, a variation in the number of revolutions of a crankshaft of an engine has been ±200 rpm with respect to 2,000 rpm. However, in recent years, engines have been enhanced in performance so as to produce a high output power, so that a variation in the number of revolution has increased to ±600 rpm to ±800 rpm. When such a large variation develops in the case where the conventional one-way clutch is used in an alternator, the number of revolutions of the alternate side also much varies in accordance with this large variation, and slip develops between a pulley of the alternator and an endless belt, and also the belt is worn. However, in the invention, even when such a large variation develops, the one-way clutch 10 can be smoothly and rapidly switched between the locked state and the free state, and can transmit power of the engine side to the rotation shaft of the alternate, while absorbing this variation.

The present invention is not limited to the illustrated embodiment, and can be provided in modified forms within the scope of the invention. Contact pressure-increasing portions (grooves 7) for causing the contact pressure concentration between the inner and/or outer rings 1 and 2 and the widthwise-intermediate portion 8 of the rollers 3 may be formed at both of the outer peripheral surface 1a of the inner ring 1 and the inner peripheral surface 2a of the outer ring 2 or may be formed at one of them. Namely, in the illustrated embodiment, the groove 7 is formed in each cam surface 11 of the inner ring 1, and the contact pressure concentration is caused to develop between the inner ring 1 and the widthwise-intermediate portion 8 of the roller 3. However, there can be provided a modified form of the invention (not shown in the drawings) in which grooves are formed respectively in the cam surfaces 11 of the inner ring 1, or these grooves are not formed in the cam surfaces 11, and grooves are formed in the inner peripheral surface 2a of the outer ring 2, and the contact pressure concentration is caused to develop between the outer ring 2 and the widthwise-intermediate portion of each roller 3. In another modified form of the invention, grooves serving as contact pressure-increasing portions are formed respectively in the contact surfaces (outer peripheral surfaces) 13 of the rollers 3.

Furthermore, although not shown in the drawings, the groove 7 may have any other suitable cross-sectional shape (such as an arcuate shape, a V-shape, a trapezoidal shape, etc.) than a rectangular shape. Furthermore, although the direction of the length of the groove 7 is perpendicular to the longitudinal direction (widthwise direction) of the roller 3, the direction of the length may be inclined relative to the longitudinal direction. Furthermore, although only one groove 7 is formed in each cam surface 11, a plurality of grooves 7 may be formed in each cam surface 11. In this case, the plurality of grooves 7 can be disposed parallel to each other, or the pair of grooves 7 can be arranged symmetrically to assume a generally V-shape.

In the one-way clutch of the above embodiment, although the rollers 3 are used as the engagement elements, the one-way clutch may be of the type in which cocoon-like sprags are used as engagement elements. In this case, the sprag has at its outer peripheral surface a radially-inward surface and a radially-outward surface which serve as contact surfaces straight in a widthwise direction. The radially-inward surface of the sprag contacts an outer peripheral surface of an inner ring, while the radially-outward surface contacts an inner peripheral surface of an outer ring, and the sprags are bitingly engaged with the inner and outer rings, and in this condition the inner and outer rings rotate in unison. When the biting engagement of the sprags with the inner and outer rings is canceled, the inner and outer rings rotate relative to each other. Grooves serving as contact pressure-increasing portions are formed in at least one of the outer peripheral surface of the inner ring and the inner peripheral surface of the outer ring or are formed in at least one of the radially-inward surfaces and the radially-outward surfaces of the sprags.

What is claimed is:
1. A one-way clutch comprising:
an inner ring;
an outer ring disposed coaxially with said inner ring;

a plurality of engagement elements interposed between said inner and outer rings; and a cage holding said plurality of engagement elements to locate said plurality of engagement elements in a circumferential direction of said inner and outer rings;

wherein, when said plurality of engagement elements contact said inner and outer rings, and are brought into biting engagement with said inner and outer rings, said inner and outer rings rotate in unison, and when said plurality of engagement elements are disposed out of biting engagement with said inner and outer rings, said inner and outer rings rotate relative to each other, wherein a contact pressure-increasing portion is formed on an outer peripheral surface of said inner ring, and said contact pressure-increasing portion serves to increase a contact pressure of an engagement element of the plurality of engagement elements relative to said inner ring at part of a region of contact between said engagement element and said inner ring, wherein the contact pressure-increasing portion comprises a groove, wherein the groove is formed on a cam surface provided on the outer peripheral surface of said inner ring such that the length of the groove, in a direction of rotation of the inner and outer rings is greater than a width of the groove in an axial direction of the inner and outer rings, wherein the groove is disposed between opposite edges of the cam surface or a portion where the engagement element is engaged on the cam surface, and wherein said contact pressure-increasing portion is defined by said groove and extends in the direction of rotation of said inner and outer rings.

2. A one-way clutch according to claim 1, wherein the width of said groove is less than a width dimension of contact surfaces of said engagement element and said inner ring contacted with each other.

3. A power transmission apparatus comprising:
an annular inner member;
an annular outer, member disposed coaxially with said inner member;
a one-way clutch as defined in claim 1 which is disposed between said inner and outer members; and
a pair of rolling bearings disposed proximate respectively to axially-opposite end portions of said one-way clutch,
wherein said outer ring of said one-way clutch rotates together with said outer member, and said inner ring of said one-way clutch rotates together with said inner member.

4. A one-way clutch according to claim 1, further comprising:
a plurality of resilient members fixed to the cage and pressing against the plurality of engagement elements, respectively.

5. A one-way clutch according to claim 1, wherein the groove comprises a depth in a range from 0.3 mm to 0.7 mm.

6. A one-way clutch according to claim 1, wherein the width of said groove is equal to or less than 30% of a width, dimension of the contact surfaces of said engagement element and said inner ring contacted with each other.

7. A one-way clutch according to claim 1, wherein an edge portion of the groove includes a chamfered portion.

8. A one-way clutch according to claim 1, wherein the groove extends in the circumferential direction.

9. A one-way clutch according to claim 1, wherein an axially outermost portion of the groove is disposed within, in the axial direction, an axially outermost portion of the cam surface.

10. A one-way clutch according to claim 1, wherein the groove extends along an entire length of the cam surface in the circumferential direction.

11. A one-way clutch according to claim 1, wherein the region of contact includes a portion of the cam surface at an axially outermost edge of the groove.

12. A one-way clutch according to claim 1, wherein the width of the groove, in the axial direction, is less than a length of the engagement element.

13. A one-way clutch according to claim 1, wherein the groove is disposed between opposite edges, in the axial direction of said inner, of the cam surface.

* * * * *